US012595727B2

(12) United States Patent
Chen et al.

(10) Patent No.: US 12,595,727 B2
(45) Date of Patent: *Apr. 7, 2026

(54) AUTOMATIC INTERPRETATION OF DRILLING DYNAMICS DATA

(71) Applicant: Schlumberger Technology Corporation, Sugar Land, TX (US)

(72) Inventors: Wei Chen, Houston, TX (US); Yingwei Yu, Katy, TX (US); Yuelin Shen, Houston, TX (US); Zhengxin Zhang, Houston, TX (US); Velizar Vesselinov, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 278 days.

This patent is subject to a terminal disclaimer.

(21) Appl. No.: 18/484,604

(22) Filed: Oct. 11, 2023

(65) Prior Publication Data

US 2024/0035369 A1 Feb. 1, 2024

Related U.S. Application Data

(63) Continuation of application No. 17/044,750, filed as application No. PCT/US2019/032082 on May 14, 2019, now Pat. No. 11,821,299.

(Continued)

(51) Int. Cl.
*E21B 44/00* (2006.01)
*E21B 49/00* (2006.01)
*G06F 18/25* (2023.01)

(52) U.S. Cl.
CPC ............ *E21B 44/005* (2013.01); *E21B 44/00* (2013.01); *E21B 49/003* (2013.01);
(Continued)

(58) Field of Classification Search
CPC ...... E21B 44/005; E21B 44/00; E21B 49/003; E21B 2200/20; E21B 2200/22; G06F 18/254
(Continued)

(56) References Cited

U.S. PATENT DOCUMENTS

| | | | | |
|---|---|---|---|---|
| 2004/0124012 A1 | 7/2004 | Dunlop et al. | | |
| 2004/0256152 A1* | 12/2004 | Dashevskiy | ............ | E21B 44/00 175/25 |

(Continued)

FOREIGN PATENT DOCUMENTS

| | | |
|---|---|---|
| CN | 105874159 A | 8/2016 |
| CN | 107075936 A | 8/2017 |

OTHER PUBLICATIONS

Etaje Darlington Christian, "Identifying the Optimum Zone for Reducing Drill String Vibrations," SPE-189284-STU, prepared for presentation at the SPE International Student Paper Contest at the SPE Annual Technical Conference and Exhibition, San Antonio, Texas, USA, Oct. 9-11, 2017, 12 pages.

*Primary Examiner* — Huy C Ho

(74) *Attorney, Agent, or Firm* — Jeffrey D. Frantz

(57) ABSTRACT

A system and method that include receiving drilling dynamics data simulated by a processor and drilling dynamics data collected by a sensor positioned in a drilling tool and extracting a feature map based on a combination of the drilling dynamics data simulated by the processor and the drilling dynamics data collected by the sensor positioned in the drilling tool. The system and method additionally include determining a feature zone from the feature map. The system and method further include selecting a drilling parameter for a drill string based on the feature zone.

20 Claims, 8 Drawing Sheets

200

Related U.S. Application Data

(60) Provisional application No. 62/671,658, filed on May 15, 2018.

(52) U.S. Cl.
CPC ........ *G06F 18/254* (2023.01); *E21B 2200/20* (2020.05); *E21B 2200/22* (2020.05)

(58) Field of Classification Search
USPC ........................................................ 175/26
See application file for complete search history.

(56) References Cited

U.S. PATENT DOCUMENTS

| | | | | |
|---|---|---|---|---|
| 2009/0114445 | A1 | 5/2009 | Dashevskiy | |
| 2014/0110167 | A1* | 4/2014 | Goebel ................ | G06N 20/10 |
| | | | | 175/24 |
| 2016/0115778 | A1* | 4/2016 | van Oort ............... | G06N 20/00 |
| | | | | 175/27 |

* cited by examiner

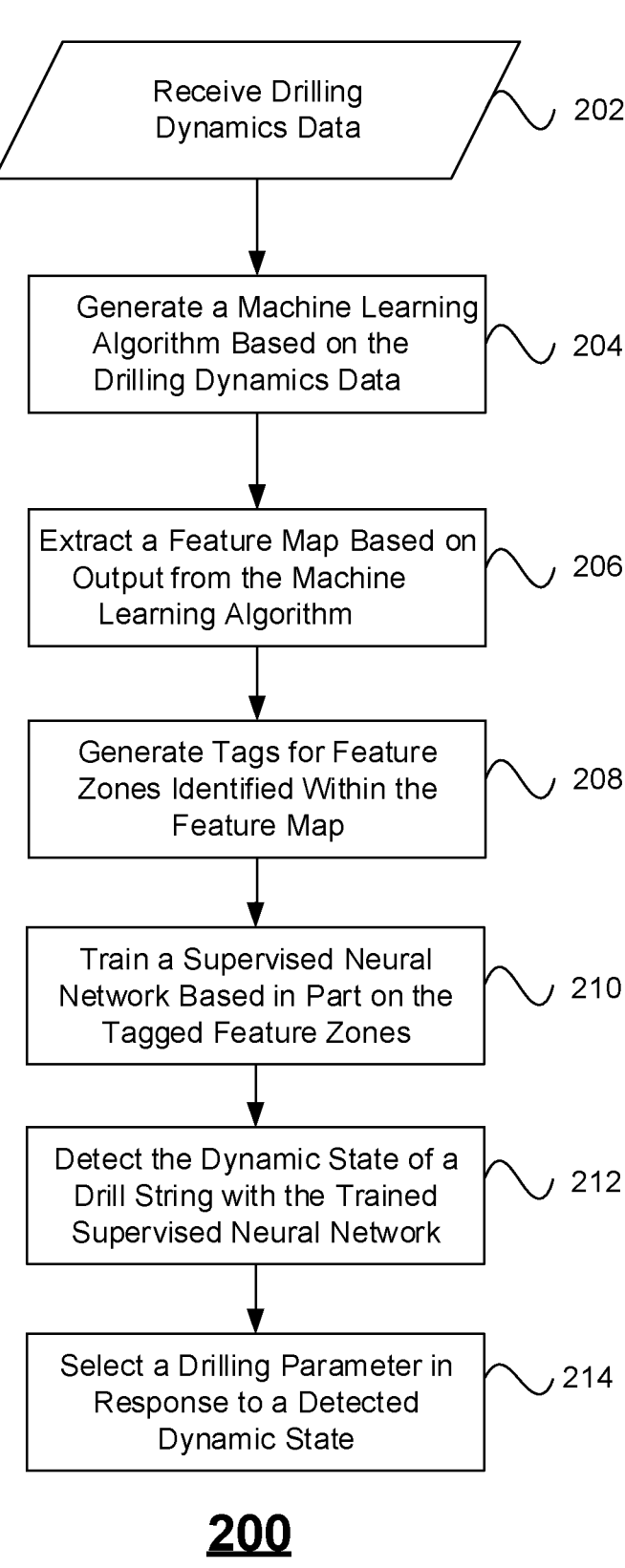

Receive Drilling Dynamics Data — 202

Generate a Machine Learning Algorithm Based on the Drilling Dynamics Data — 204

Extract a Feature Map Based on Output from the Machine Learning Algorithm — 206

Generate Tags for Feature Zones Identified Within the Feature Map — 208

Train a Supervised Neural Network Based in Part on the Tagged Feature Zones — 210

Detect the Dynamic State of a Drill String with the Trained Supervised Neural Network — 212

Select a Drilling Parameter in Response to a Detected Dynamic State — 214

AUTOMATIC INTERPRETATION OF DRILLING DYNAMICS DATA

RELATED APPLICATIONS

This application is a continuation of a co-pending U.S. patent application Ser. No. 17/044,750 filed on 1 Oct. 2020 (published as US 2021/0164334), which was the National Stage of International Application No. PCT/US2019/032082 filed on 14 May 2019 which claims priority to and benefit of a US Provisional Application having Ser. No. 62/671,658, filed 15 May 2018, all of which are incorporated herein by reference.

BACKGROUND

During drilling in, for example, oil and gas wells, measurement and logging data are often collected using surface equipment and/or downhole equipment. These operations are often referred to as "logging while drilling" and "measuring while drilling", and both are employed in the oilfield to collect data related to drilling operations and formation characteristics with success, albeit with many challenges. One way such data is used is to assess drilling risk, e.g., the likelihood of a hazard or another event harmful to the completion of the drilling operation or otherwise successful operation of the well.

SUMMARY

According to one aspect, a method for interpreting drilling dynamics data may include receiving drilling dynamics data simulated by a processor and drilling dynamics data collected by a sensor positioned in a drilling tool. The method may also include extracting a feature map based on a combination of the drilling dynamics data simulated by the processor and the drilling dynamics data collected by the sensor positioned in the drilling tool. The method may additionally include determining a feature zone from the feature map. The feature zone corresponds to a predetermined dynamic state and includes simulated data values that are associated with the drilling dynamics data simulated by the processor and sensor data values that are associated with the drilling dynamics data collected by the sensor, the feature zone is determined using a neural network trained to associate a plurality of feature zones with a plurality of dynamic states. The method may further include selecting a drilling parameter for a drill string based on the feature zone.

According to another aspect, a computing system for interpreting drilling dynamics data that may include one or more processors. The system may also include a memory system comprising one or more non-transitory computer-readable media storing instructions that, when executed by at least one of the one or more processors, cause the computing system to perform operations. The operations may include receiving drilling dynamics data simulated by a processor and drilling dynamics data collected by a sensor positioned in a drilling tool. The operations may additionally include extracting a feature map based on a combination of the drilling dynamics data simulated by the processor and the drilling dynamics data collected by the sensor positioned in the drilling tool. The operations may also include determining a feature zone from the feature map. The feature zone corresponds to a predetermined dynamic state and includes simulated data values that are associated with the drilling dynamics data simulated by the processor and sensor data values that are associated with the drilling dynamics data collected by the sensor, the feature zone is determined using a neural network trained to associate a plurality of feature zones with a plurality of dynamic states. The operations may further include selecting a drilling parameter for a drill string based on the feature zone.

According to yet another aspect, a non-transitory computer-readable medium storing instructions that, when executed by one or more processors of a computing system, cause the computing system to perform a method for interpreting drilling dynamics data. The method may include receiving drilling dynamics data simulated by a processor and drilling dynamics data collected by a sensor positioned in a drilling tool. The method may additionally include extracting a feature map based on a combination of the drilling dynamics data simulated by the processor and the drilling dynamics data collected by the sensor positioned in the drilling tool. The method may also include determining a feature zone from the feature map. The feature zone corresponds to a predetermined dynamic state and includes simulated data values that are associated with the drilling dynamics data simulated by the processor and sensor data values that are associated with the drilling dynamics data collected by the sensor, the feature zone is determined using a neural network trained to associate a plurality of feature zones with a plurality of dynamic states. The method may further include selecting a drilling parameter for a drill string based on the feature zone.

In an embodiment, the method may include extracting the feature map from the drilling dynamics data based on a combination of data simulated by the processor and data collected by the sensor positioned in a drilling tool.

In an embodiment, the feature zone corresponds to an axial movement of the drill string, a torsional movement of the drill string, or a lateral movement of the drill string.

In an embodiment, adjusting the drilling parameter can include adjusting a rotation of the drill string or adjusting a flow rate of the drill string.

In an embodiment, creating the drilling dynamics data simulated by the processor can include simulating a load on the drill string based on one or more predetermined rock formation characteristics.

In an embodiment, the data collected by the sensor positioned in the drilling tool can include first acceleration values, second acceleration values, and revolutions per minute (RPM) values.

In an embodiment, the drilling dynamics data simulated by the processor can include displacement values.

In an embodiment, extracting a feature map from the drilling dynamics data can include training a regression based neural network based on input including first acceleration values, second acceleration values, RPM values, and the drilling dynamics data simulated by the processor. In some examples, extracting the feature map can also include generating the feature map based on the trained regression based neural network encoding the input in two-dimensional space.

In an embodiment, the method can also include detecting multiple feature zones for the feature map. In some examples, the feature zones can correspond to different dynamic states.

In an embodiment, the method can further include classifying the feature with the neural network based a plurality of input channels including first acceleration values, second acceleration values, and revolutions per minute (RPM) values.

In an embodiment, the method can also include adjusting the drilling parameter for the drill string in response to determining that drilling sensor data for the drill string is associated with the feature zone corresponding to the pre-determined dynamic state.

Embodiments of the disclosure may also provide a computing system that can include processors, and a memory system that can include non-transitory computer-readable media storing instructions that, when executed by the processors, cause the computing system to perform operations for interpreting drilling dynamics data, wherein the operations include receiving drilling dynamics data simulated by a processor or collected by a sensor positioned in a drilling tool. The operations can also include extracting a feature map from the drilling dynamics data and determining that a feature zone from the feature map corresponds to a prede-termined dynamic state using a neural network trained to associate feature zones with dynamic states. Furthermore, the operations can include selecting a drilling parameter for a drill string based on the feature zone.

Embodiments of the disclosure may further provide a non-transitory computer-readable medium storing instruc-tions that, when executed by processors of a computing system, cause the computing system to perform operations for interpreting drilling dynamics data, the operations including receiving drilling dynamics data simulated by a processor or collected by a sensor positioned in a drilling tool. The operations can also include extracting a feature map from the drilling dynamics data and determining that a feature zone from the feature map corresponds to a prede-termined dynamic state using a neural network trained to associate feature zones with dynamic states. Furthermore, the operations can include selecting a drilling parameter for a drill string based on the feature zone.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodi-ments of the present teachings and together with the descrip-tion, serve to explain the principles of the present teachings. In the figures:

FIG. 2 illustrates a process flow diagram of an example method for interpreting drilling dynamics data, according to an embodiment.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various ele-ments, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be under-stood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, ele-ments, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, meth-ods, techniques, and workflows that are in accordance with some embodiments. Some operations in the processing procedures, methods, techniques, and workflows disclosed herein may be combined and/or the order of some operations may be changed.

Figure 1:
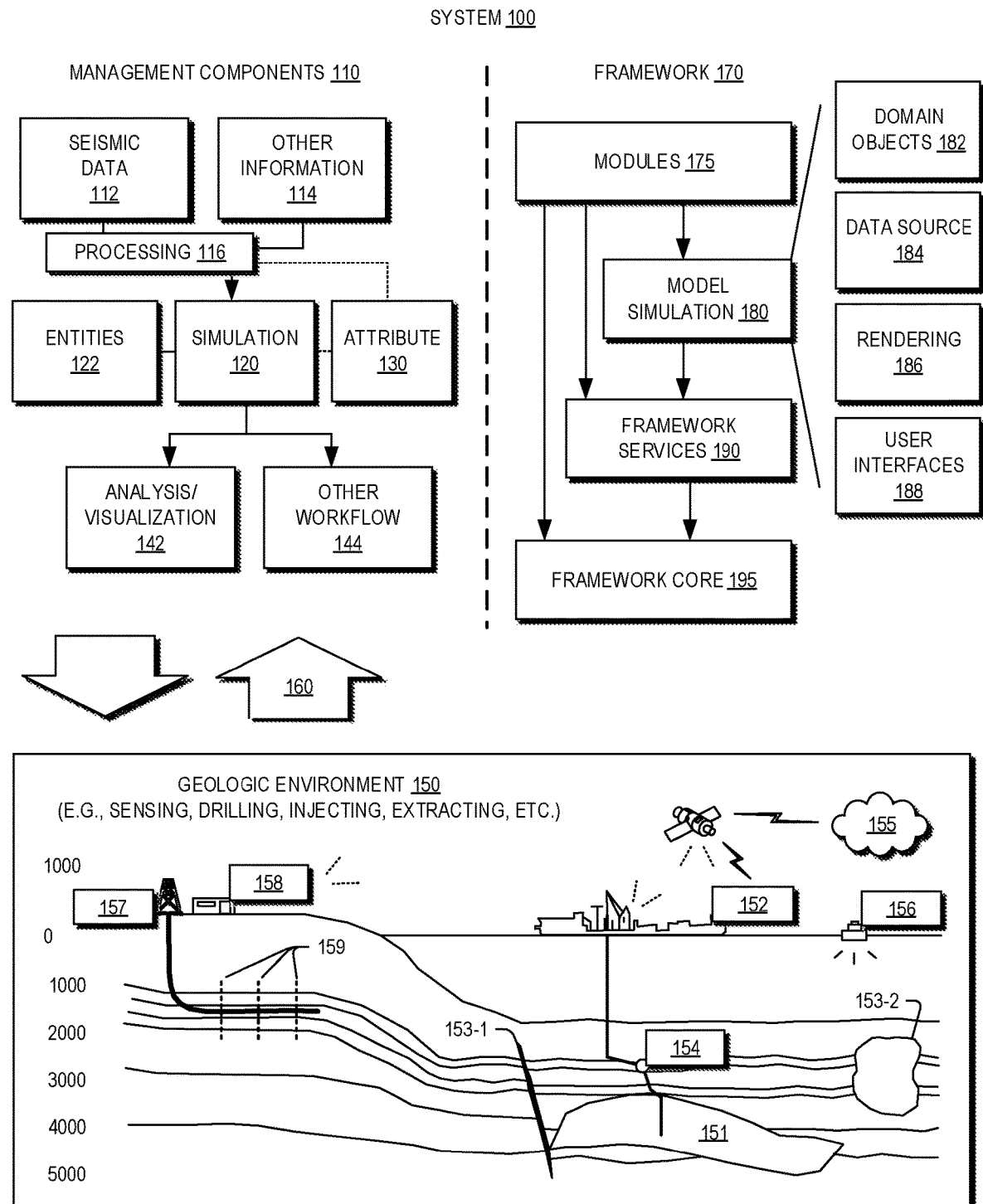
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic envi-ronment 150 may become available as feedback 160 (e.g., optionally as input to one or more of the management components 110).

In the example of FIG. 1, the management components 110 include a seismic data component 112, an additional information component 114 (e.g., well/logging data), a pro-cessing component 116, a simulation component 120, an attribute component 130, an analysis/visualization compo-nent 142 and a workflow component 144. In operation, seismic data and other information provided per the com-ponents 112 and 114 may be input to the simulation com-ponent 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data component 112 and other information from additional information component 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Interpreting drilling dynamics data to assess drilling risk can be used for drilling optimization. Embodiments of the disclosure may automatically identify severe drilling dynamics modes, such as backward whirling and high frequency torsional vibration, directly from the time series data with a semi-supervised learning approach. The time-series drilling dynamics data can be obtained from drilling simulation or downhole senor measurement. Drilling dynamics data can include, but are not limited to, acceleration, rotation (RPM), bending moment, downhole torque, and downhole weight, etc. In some embodiments, machine learning techniques can be employed to generate a feature map, which enables pattern exploration of the drilling dynamics data.

Along with the feature maps, the knowledge of physics of drilling dynamics can be employed to facilitate the clustering the drilling dynamics data in the feature map. Each clustering of data can be tagged with the corresponding drilling dynamics mode. With the tagged dataset, a machine learning classification model (deep neutral network, or HMM) can be trained to automatically interpret the dynamics modes based on the input of time series drilling dynamics data. In some embodiments, the automatic interpretation provides a high level description of data, which can be employed to guide a bottom hole assembly (BHA) and enable drilling parameter optimization.

FIG. 2 illustrates a process flow diagram of an example method 200 for interpreting drilling dynamics data. In some embodiments, the method 200 can be implemented with any suitable computing device, such as computer system 701A of FIG. 7, which is described in greater detail below.

At block 202, the method 200 can include receiving or detecting drilling dynamics data such as simulation data, sensor measurement data, or any combination thereof. In some embodiments, the simulation data can be generated with any suitable simulation software that applies various operating characteristics to a drill string in a virtual environment. For example, the simulation data can be generated based on a simulated load applied to a drill string. In some embodiments, the simulation data can be generated with any suitable predetermined operating characteristics such as a depth of a bottom hole assembly attached to the drill string, rock formation characteristics, and the like. In some embodiments, the sensor measurement data can be detected from any number of sensors positioned in a drilling tool or otherwise coupled to the drill string and/or bottom hole assembly (BHA). The simulation data can indicate a horizontal displacement of a drill string, a vertical displacement of a drill string, or a combination thereof. In some implementations, the sensors can monitor a rotation of the drill string and/or BHA in revolutions per minute (RPM), or any other suitable measurement. The sensors can also measure the acceleration of the drill string and/or BHA in multiple directions. For example, a first acceleration data value can indicate the acceleration of the drill string and/or BHA in a direction perpendicular to the ground level and a second acceleration data value can indicate the acceleration of the drill string and/or BHA in lateral directions parallel to the ground level.

At block 204, the method 200 can include generating a machine learning algorithm, such as a regression based neural network, among others, based on the drilling dynamics data including simulation data and/or sensor measurement data. For example, the method 200 can include generating a neural network that detects any number of input data streams, such as a first acceleration data stream, a second acceleration data stream, and a rotation data stream, among others. In some embodiments, the neural network can detect fewer or additional data streams indicating the lateral spin, depth, location, and the like, of the drill string or bottom hole assembly. In some examples, the neural network can include any suitable number of interconnected layers of neurons in various layers. For example, the neural network can include any number of fully connected layers of neurons that organize the data provided as input. The organized data can enable visualizing feature zones corresponding to dynamic states in a feature map, which is described in greater detail below in relation to block 206.

The neural network can employ any suitable encoding or clustering techniques such as k-means clustering, hierarchical clustering, and the like. In some embodiments, each sensor measurement data point can initially be placed in a first cluster, and the first cluster can be merged with additional clusters using a bottom-up approach. In another embodiment, the sensor measurement data points can be included in a first cluster, and the first cluster can be split using recursive techniques as the neurons of the neural network move in a top-down approach. The sensor measurement data points can be combined or split based on a dissimilarity value between the sensor measurement data points. For example, the dissimilarity value can indicate a distance between two sensor measurement data points or two sets of sensor measurement data points. The distance can be calculated using any suitable technique such as a Euclidean distance, a squared Euclidean distance, a Manhattan distance, a Maximum distance, or a Mahalanobis distance, among others. In some embodiments, the neural network can also include linkage criteria that specifies the dissimilarity of sets of sensor measurement data as a function of pairwise distances of data points in the sets of sensor measurement data. For example, the linkage criteria can be calculated using Maximum or complete-linkage clustering, Minimum or single-linkage clustering, unweighted average linkage clustering, weighted average linkage clustering, centroid linking clustering, or minimum energy clustering, among others.

In some embodiments, the neural network can partition the sensor measurement data into any number of clusters by including each sensor measurement data value in a cluster based on a nearest mean. In some examples, each sensor measurement data value can be assigned to a new cluster with a mean that has a least squared Euclidean distance. The neural network can, in some implementations, calculate a new mean value or centroid for the sensor measurement values in the new clusters. In some embodiments, the neural network can halt assigning sensor measurement data values to new clusters when the assignments converge or no longer change. Example output from the neural network is described below in relation to FIG. 3.

At block 206, the method 200 can include extracting a feature map based on output from the machine learning algorithm. In some examples, the feature map can project or encode multi-dimensional data points into two-dimensional space. For example, the feature map can include a two-dimensional representation of any number of input data streams for any suitable window or time size. In some embodiments, the input data streams can correspond to a drill string acceleration in a horizontal direction, a drill string acceleration in a vertical direction, and a rotation of a drill string, among others. The window or time size can include any suitable time range from which the input data streams are collected. In some embodiments, the data points in the feature map correspond to a rotation speed of a drill string and/or BHA, and an acceleration of the drill string and/or BHA. The feature map can also include simulated data values corresponding to a vertical and/or horizontal displacement of a drill string or BHA. The data points related to displacement values can be represented in the feature map as a larger shape, such as a circle, among others. The data points corresponding to smaller displacement values can be represented with smaller points. In some embodiments, extracting the feature map from the drilling dynamics data can be based on a combination of data simulated by the processor and data collected by a sensor positioned in a drilling tool.

At block 208, the method 200 can include implementing exploration tagging by generating tags for feature zones identified within the feature map. In some embodiments, the simulated data values and sensor data values of the feature map can be included within feature zones that can be tagged or associated with dynamic states. For example, the tags can identify dynamic states such as whirling or non-whirling of a drill string and/or BHA, washout regions of a wellbore, and the like. In some examples, the tags can be provided to the supervised neural network described in greater detail below in relation to block 210. The tags can enable the supervised neural network to detect features indicating a dynamic state of a drill string or well bore.

Figure 3:
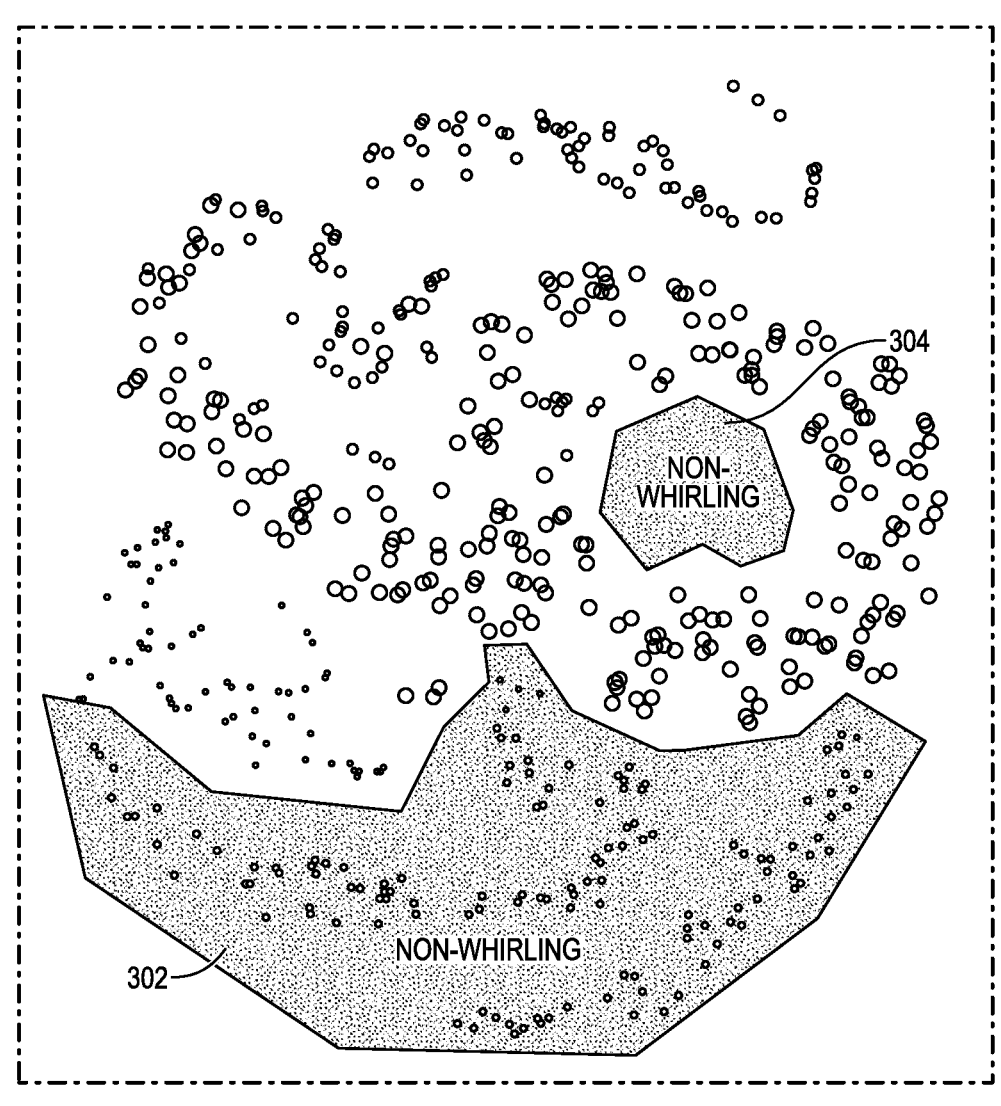
FIG. 3 is an example feature map generated based on output from a neural network, according to an embodiment.

In some embodiments, the feature zones can be polygon regions that include any suitable area within the feature map that corresponds to a dynamic state. For example, the polygon regions or feature zones can include any number of data points from the output of the neural network that represent dynamic states such as whirling of the drill string, an axial dynamic state, such as a bit bounce, a torsional dynamic state, such as a drill string stick or drill string slip, a lateral dynamic state, such as a drill string bend, a stable state, and the like. In some implementations, the polygon regions can be generated using machine learning techniques. For example, the polygon regions can be identified with any suitable classification technique that can determine a similarity or dissimilarity between sets of data points represented in the feature map. In some examples, the polygon regions can be detected as labeled input from any suitable input/output device. An example feature map is illustrated in FIG. 3, which is described in greater detail below.

At block 210, the method 200 can include training a supervised neural network based on simulated data and/or sensor data, and the feature zones identified with the tags. In some embodiments, the method 200 includes providing any number of tagged or labeled input data streams to the supervised neural network such as the first acceleration data values, the second acceleration data values, and the rotation data values associated with a feature map. In some examples, the supervised neural network can be trained with labeled feature maps that include feature zones identified with dynamic state tags associated with the simulated data values and the sensor data values of the labeled feature maps. In some embodiments, the supervised neural network can be trained with feature zones corresponding to any number of feature maps and different dynamic states. Accordingly, the trained supervised neural network, in some examples, can detect any number of dynamic states of a drill string. In some embodiments, the trained supervised neural network is a classifier that can classify real-time sensor data to determine a dynamic state of the drill string, as described in greater detail below in relation to block 212.

In various implementations, the supervised neural network can implement any suitable machine learning technique with any number of layers of neurons. For example, the supervised neural network can include two or more fully interconnected layers of neurons, in which each layer of neurons identifies a broader characteristic of the data. In some embodiments, the supervised neural network can be a deep neural network in which weight values are adjusted during training based on any suitable cost function and the tags generated based on the simulated values. In some examples, additional techniques can be combined to train the supervised neural network. For example, the supervised neural network can be trained using reinforcement learning, or any other suitable techniques. In some embodiments, the supervised neural network can be implemented with support vector machines, regression techniques, naïve Bayes techniques, decision trees, similarity learning techniques, and the like.

At block 212, the method 200 can include detecting the dynamic state of a drill string in real-time with the trained supervised neural network classifier. For example, sensor data from a drill string removing debris from a borehole can be provided to the trained supervised neural network. In some embodiments, the trained supervised neural network can provide output indicating a dynamic state of the drill string. For example, the dynamic state can indicate a stable state or the dynamic state can indicate an unstable state if the drill string is experiencing whirling, a bit bounce, a drill string bend, a drill string stick, or a drill string slip, among others. In some examples, the dynamic state can indicate a backward whirl, a chaotic whirl, or a forward whirl, among others. If the method 200 indicates that the dynamic state is an unstable state, the method 200 can include adjusting a drilling parameter at block 214.

At block 214, the method 200 can include selecting or adjusting a drilling parameter in response to a detected dynamic state. The selected or adjusted drilling parameter can include modifying the rotation or lateral spin of the drill string or modifying the flow rate, among others. For example, the method 200 can include reducing or increasing the rotation of the drill string. In some embodiments, the method 200 can include modifying the weight on the bit. In some examples, selecting the drilling parameter can include detecting a feature zone within an application implementing the trained supervised neural network and modifying the drilling parameter based on the detected feature zone. In some embodiments, the method 200 can include transmitting an adjustment to the drilling parameter to an external server, database, or electromechanical device, among others. By transmitting the adjustment to the external device, the method 200 can cause a drill string and/or BHA to rotate at an alternate speed, exert a different weight on a drilling bit attached to the drill string, and the like. In some examples, the method 200 can include transmitting an alert that the drilling parameter is to be adjusted. The alert can be transmitted to any suitable external device that controls the rotation of a drill string. In some embodiments, the method 200 can also include displaying a dynamic state of the drill string, a displacement of the drill string, a dynamic state of a bottom hole assembly, or a displacement of the bottom hole assembly, among others.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

FIG. 3 is an example feature map generated based on output from a neural network. In some examples, the feature map 300 can include any number of data points that are encoded or clustered based on various unsupervised machine learning techniques. The feature zone tags 302 and 304 can correspond to any suitable dynamic state such as whirling of the drill string and/or BHA, non-whirling of the drill string and/or BHA, and the like. In some embodiments, the feature zone tags 302 and 304 are detected using machine learning techniques or as input from a user. In some examples, machine learning techniques, such as neural networks, among others, can implement clustering techniques that generate clusters representing similar or dissimilar data points. In some embodiments, the clusters of data points can be spaced within the feature map based on any suitable distance calculation techniques including a Manhattan distance, a Euclidean distance, and the like. The size of the data points represented in a feature map can indicate the displacement values of simulated data, a number of data points included in a cluster, or a similarity of the data points included in the cluster, among other characteristics.

In some embodiments, a feature zone can include any shape or polygon that represents a dynamic state. For example, a polygon can include any number of sides and can enclose data points related to a dynamic state. In some examples, multiple instances of the same dynamic state can be represented within feature map. Additionally, in some embodiments, instances of different dynamic states can also be represented within a feature map.

Figure 4:
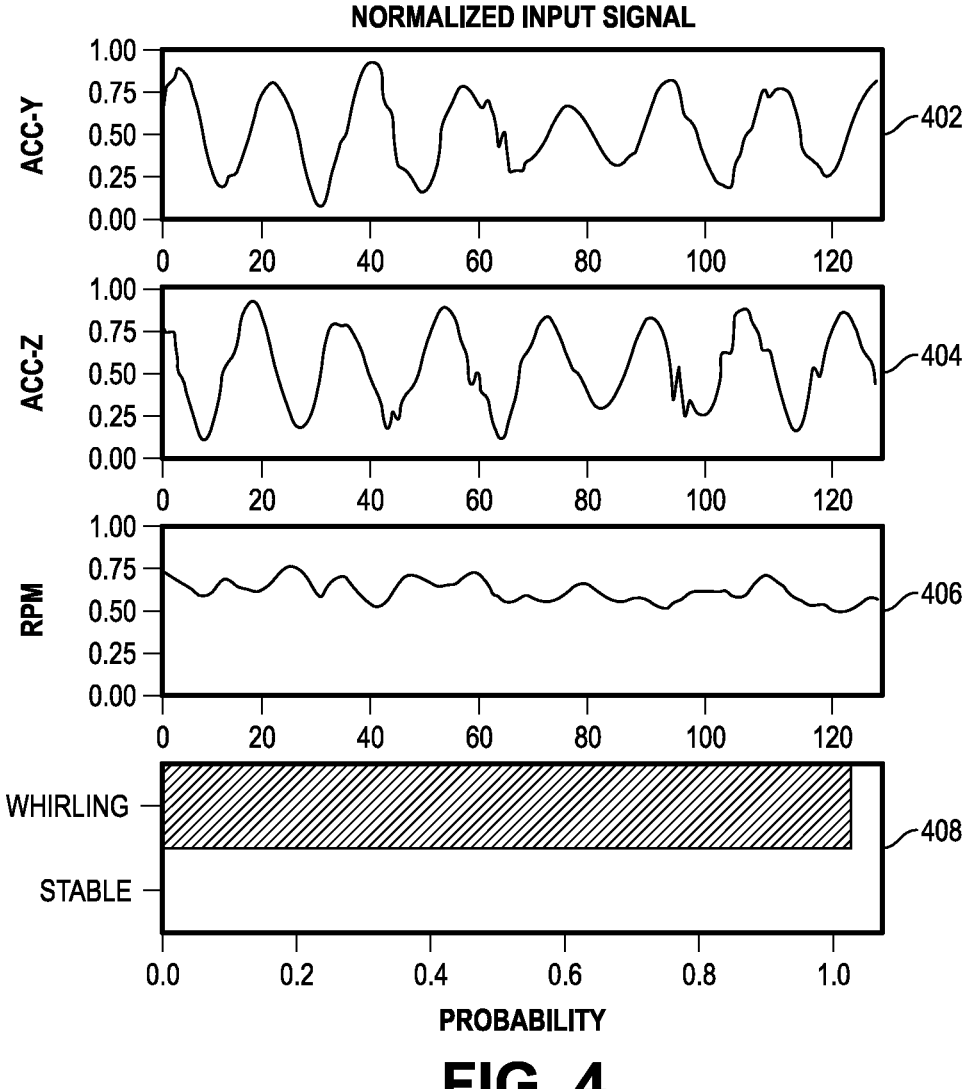
FIG. 4 depicts three separate input data streams corre-sponding to sensor data received from downhole sensors, according to an embodiment.
Figure 4:
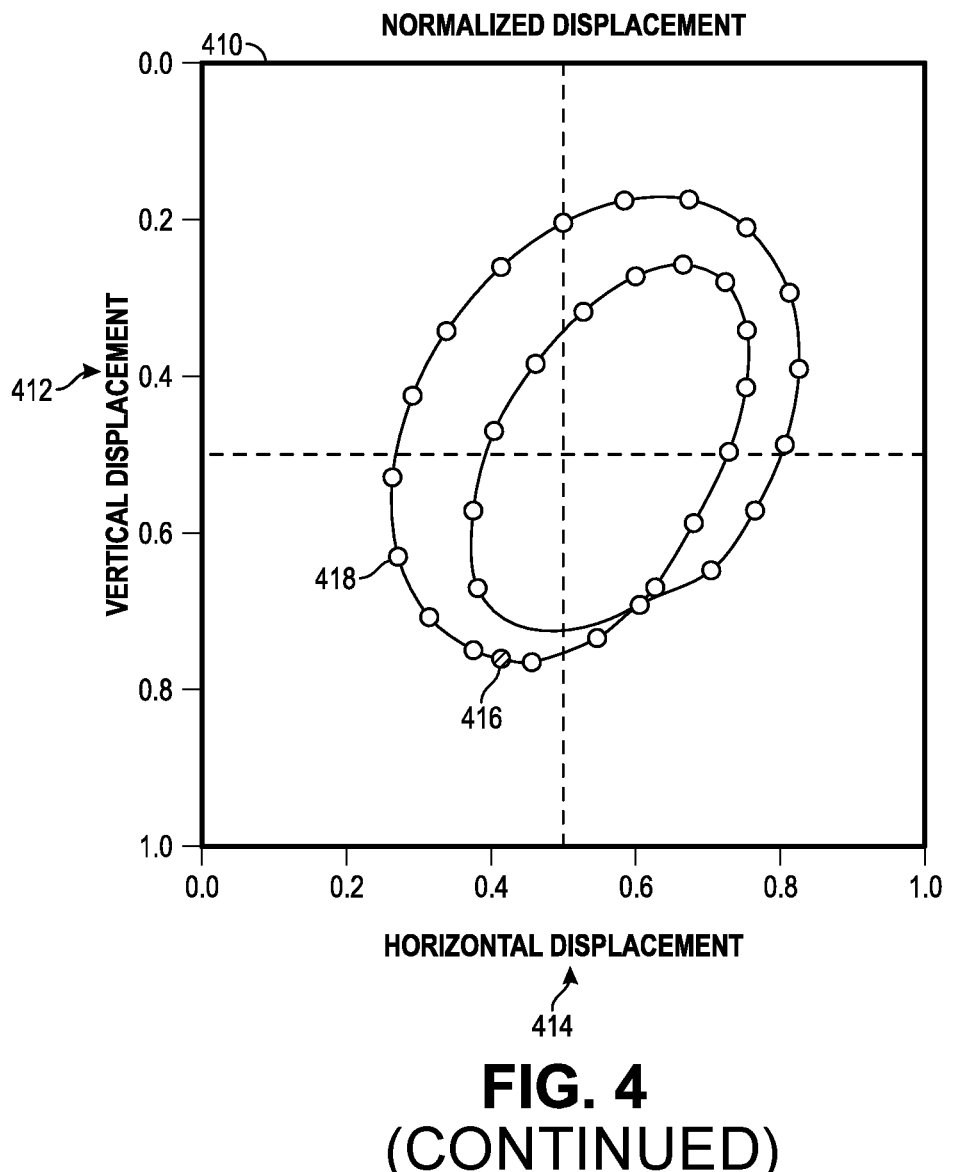

FIG. 4 depicts three separate input data streams corresponding to sensor data received from downhole sensors in a drilling tool. For example, the input data streams can include an acceleration Y input data stream 402, an acceleration Z input data stream 404, and an RPM data stream 406. The acceleration Y input data stream 402, acceleration Z input data stream 404, and RPM data stream 406 can indicate the acceleration and rotation of a drill string and/or BHA in a wellbore. In some embodiments, techniques herein can also display a dynamic state of a drill string and/or BHA. For example, FIG. 4 also indicates the dynamic state 408 of the drill string based on the probability that the drill string is in a whirling versus stable state. In some examples, the normalized displacement 410 corresponding to the simulated data can also be displayed (as indicated on the continued Drawing Sheet for FIG. 4). The normalized displacement 410 can indicate an estimated vertical displacement 412 and estimated horizontal displacement 414 based on simulated data and the sensor data. In some embodiments, a current normalized displacement of a drill string can be displayed as any suitable shape 416, while previous estimated normalized displacement values of the drill string can be displayed as different shades of a shape 418.

In some embodiments, the simulated data can be based on vibration modeling techniques such as frequency domain modeling and time domain modeling. In some examples, frequency domain modeling can compute natural frequencies of the drill string and bottom hole assembly. Time domain models can determine an interaction between a drill string and a borehole wall. In some embodiments, the time domain models can detect a backward whirl, forward whirl, or chaotic whirl of a drill string and/or BHA. In some examples, the time domain models can also indicate a rotation of bends and kinks in a drill string.

Figure 5:
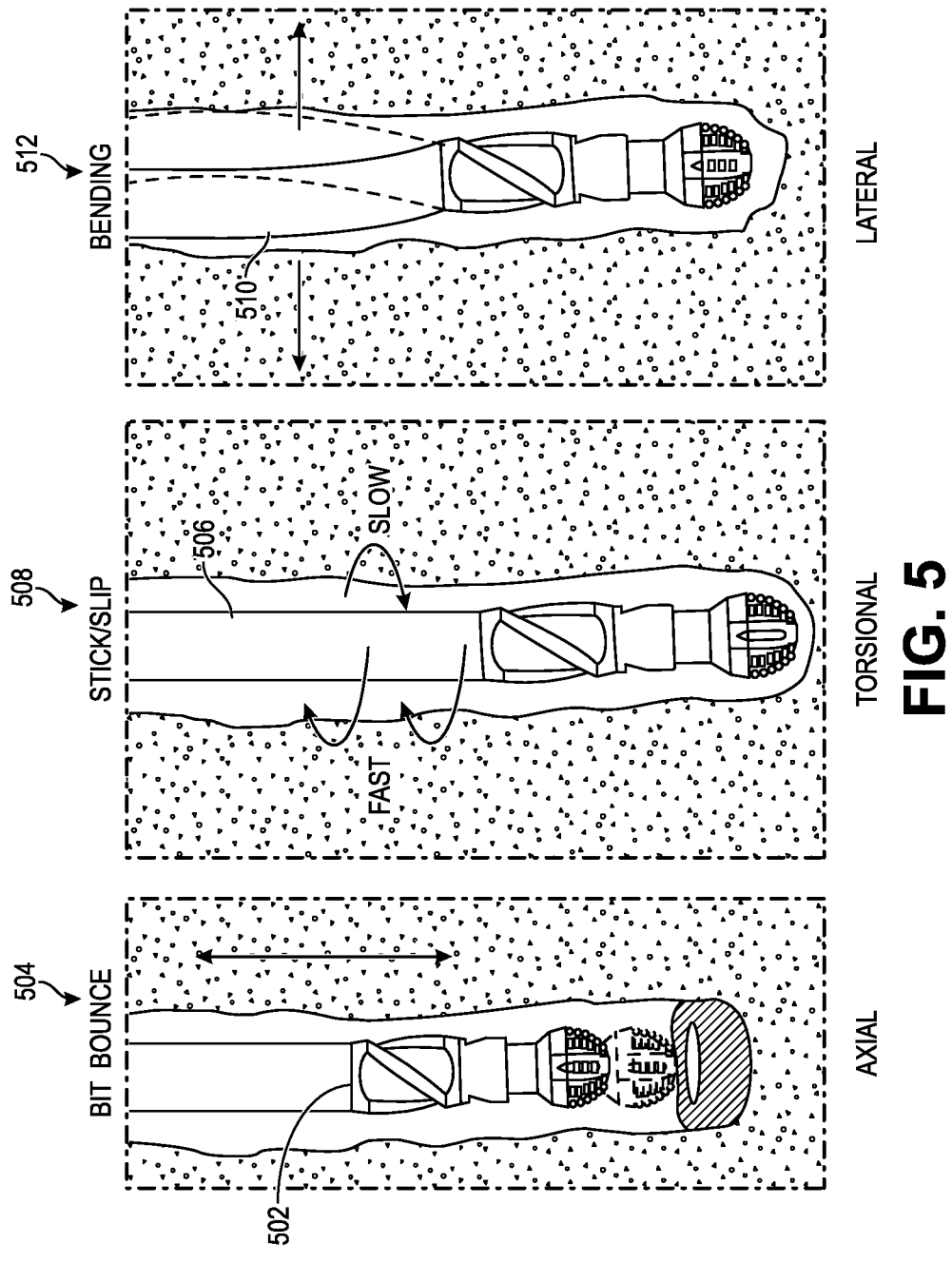
FIG. 5 is an example diagram of dynamic states of a drill string, according to an embodiment.

FIG. 5 is an example diagram of various dynamic states of a drill string. Lateral vibrations can create shocks as the bottom hole assembly of a drill string impacts a wellbore wall. The interaction between the BHA and drill string contact points can drive the system into a dynamic state such as backward whirl, which can create high-frequency large-magnitude bending moment fluctuations that result in high rates of component and connection fatigue. In some examples, imbalance in an assembly can cause centrifugally induced bowing of the drill string, which can cause forward whirl and result in one-sided wear of components.

In some examples, a drill string 502 can encounter an axial dynamic state issue such as bit bounce 504. In some examples, a drill string 506 can encounter a torsional dynamic state issue such as stick or slip 508. In some examples, the drill string 510 can encounter a lateral dynamic state issue such as bending of the drill string 512. In some embodiments, axial, torsional, and lateral vibrations can occur during rotary drilling and can be coupled together.

For example, induced axial vibrations at a bit of a drill string can lead to lateral vibrations in a bottom hole assembly attached to the drill string. Axial and torsional vibrations, in some examples, can be related to lateral vibrations down-hole near the bit.

Figure 6:
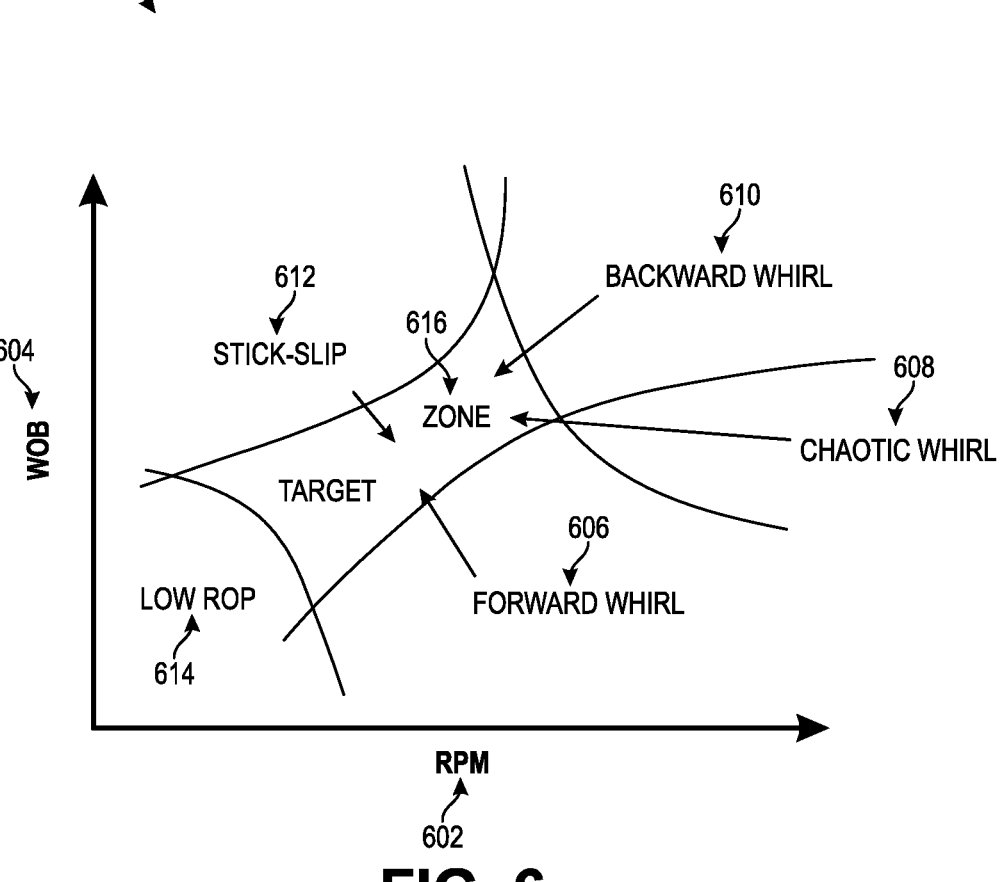
FIG. 6 represents an example chart illustrating adjusting a drilling parameter in response to a detected dynamic state, according to an embodiment.

FIG. 6 represents an example chart illustrating adjusting a drilling parameter in response to a detected dynamic state. For example, the chart 600 illustrates a rotation per minute (RPM) 602 in conjunction with a weight on a bit (WOB) 604. In some examples, forward whirl 606 can be prevented by adjusting the drilling parameter to increase the WOB 604. The forward whirling 606 can include movement of the center of rotation around a face of a bit attached to a drill string. In some examples, forward whirl 606 can include rubbing the same part of a BHA and drill collar along a formation as the drill string rotates. If the formation is abrasive, excessive wear can occur along the part of drill collar that rubs the formation. In some examples, forward whirl wear is seen as a single worn blade, stabilizer, or one side of a drill collar.

In some embodiments, chaotic whirling 608 can be prevented by reducing the RPM 602 of the drill string. In some examples, there is no preferential side of the collars of the BHA contacting the formation during chaotic whirling 608. In some embodiments, the torque can be above average along with the lateral vibration and shocks. In some examples, chaotic whirl 608 can occur when changing rotary RPM to address forward whirl or backward whirl.

In some implementations, backward whirling 610 can be prevented by reducing the RPM 602 of the drill string and reducing the WOB 604. During backward whirling 610, a bottom hole assembly attached to the drill string can rotate backwards in relation to the rotation of the drill string. In some examples, stick-slip 612 of the drill string can be prevented by reducing the WOB 604 of the drill string. For example, stick and slip 612 can refer to the irregular or non-uniform rotation of the drill string. In some examples, stick and slip 612 of the drill string is the rotational slowing down and acceleration of the BHA. In some cases, the BHA can stop, or even reverse the directional rotation of the BHA. Stick and slip 612 can be caused by differential pressure or an irregular hole. The bottom hole assembly can move, or slip, quickly in the bore hole until the normal movement is resumed. In some embodiments, a low rate or penetration (ROP) 614 can correspond to a low RPM 602 and low WOB 604. The adjustment of the drilling parameter to modify the RPM 602 and/or WOB 604 of the drill string can enable drilling operations within the target zone 616.

Figure 7:
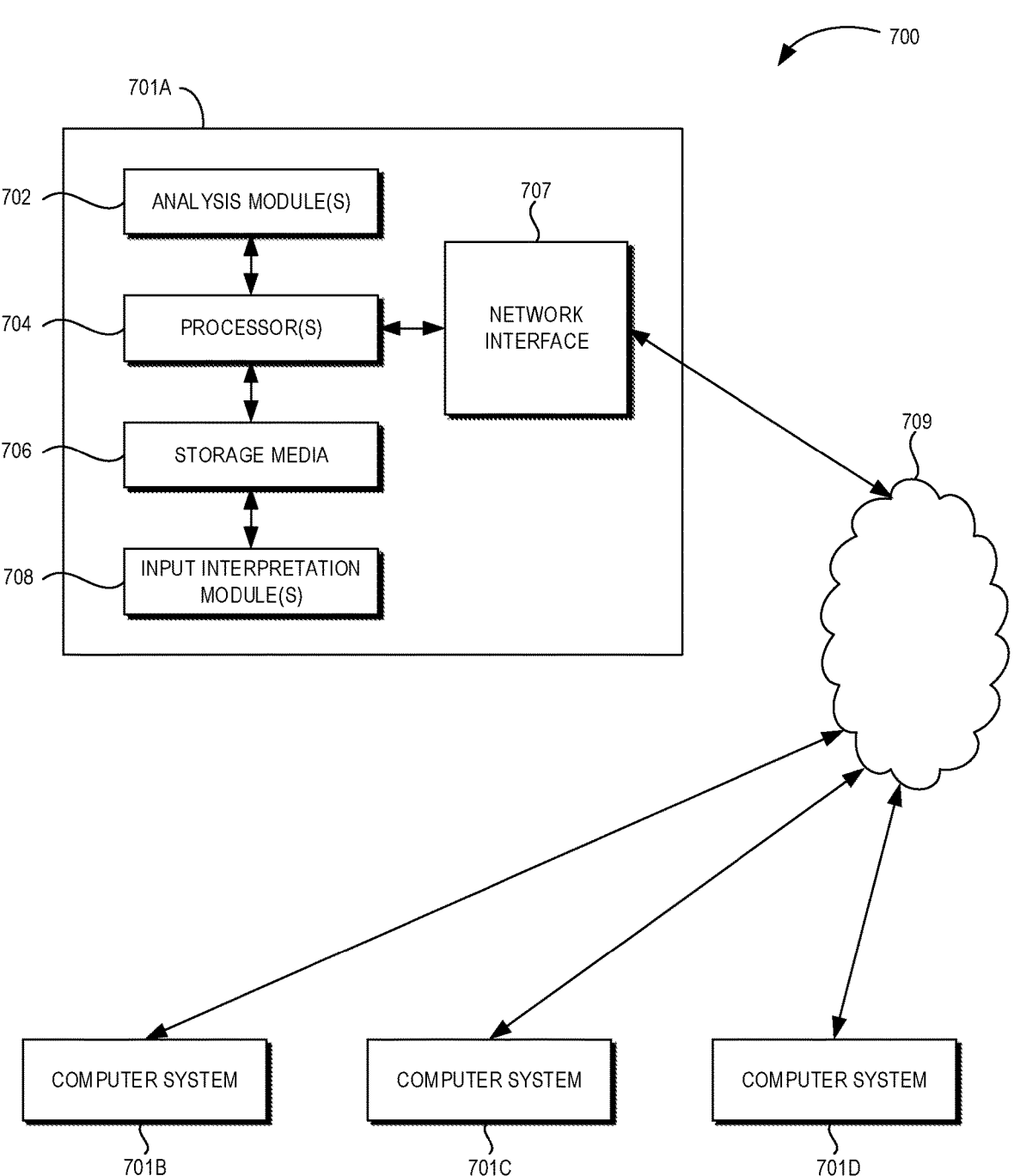
FIG. 7 illustrates a schematic view of a computing sys-tem, according to an embodiment.

In some embodiments, the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis modules 702 that are configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor may include a microprocessor, microcontroller, processor module or subsystem, programmable integrated circuit, programmable gate array, or another control or computing device.

The storage media 706 may be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 700 contains one or more drilling dynamics interpretation modules 708. In the example of computing system 700, computer system 701A includes the drilling dynamics interpretation module 708. In some embodiments, a single drilling dynamics interpretation module may be used to perform some aspects of one or more embodiments of the methods disclosed herein. In other embodiments, a plurality of drilling dynamics interpretation modules may be used to perform some aspects of methods herein.

It should be appreciated that computing system 700 is merely one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method for interpreting drilling dynamics data, the method comprising:

receiving multi-dimensional drilling dynamics data collected by a sensor positioned in a drilling tool;

determining a feature zone from a feature map based on the multi-dimensional drilling dynamics data, wherein;

the feature map comprises a two-dimensional representation of a plurality of points that encodes multi-dimensional drilling dynamics data;

the feature zone includes a subset of the plurality of points within a polygon region in the two-dimensional representation of the feature map;

the feature zone corresponds to a predetermined dynamic state associated with the received multi-dimensional drilling dynamics data; and the feature zone is determined using a supervised neural network trained to associate a plurality of feature zones with a plurality of dynamic states; and selecting at least one drilling parameter for a drill string based on the dynamic state corresponding to the determined feature zone.

2. The method of claim 1, wherein the multi-dimensional drilling dynamics data encoded by the feature map includes drilling dynamics data simulated by a processor including data associated with a simulation of a load on the drill string based on one or more predetermined rock formation characteristics.

3. The method of claim 1, wherein the multi-dimensional drilling dynamics data collected by the sensor positioned in the drilling tool includes at least one of: a first acceleration value, a second acceleration value, or a revolutions per minute value.

4. The method of claim 1, further comprising generating a machine learning algorithm based on the multi-dimensional drilling dynamics data, wherein the multi-dimensional drilling dynamics data includes drilling dynamics data simulated by a processor and drilling dynamics data collected by the sensor positioned in the drilling tool, and wherein the feature map is based upon an output from the machine learning algorithm.

5. The method of claim 1, wherein the two-dimensional representation is of a plurality of input data streams for a time window.

6. The method of claim 5, wherein the plurality of input data streams includes at least one of: a drill string acceleration in a horizontal direction, a drill string acceleration in a vertical direction, or a rotation of a drill string.

7. The method of claim 1, wherein the dynamic state corresponding to the feature zone comprises an axial movement of the drill string, a torsional movement of the drill string, or a lateral movement of the drill string.

8. The method of claim 1, wherein selecting the at least one drilling parameter includes selecting at least one of: a rotation of the drill string or a flow rate of the drill string.

9. The method of claim 1, wherein determining the feature zone further comprises applying a distance-based clustering constraint that assigns sensor data values to the feature zone only when a Euclidean distance between the sensor data values and a centroid of the feature zone satisfies a predetermined threshold.

10. The method of claim 1, wherein the multi-dimensional drilling dynamics data is encoded in the two-dimensional representation in the feature map based on a regression-based neural network configured to update centroid positions of clusters until assignment of sensor data values converges.

11. A computing system for interpreting drilling dynamics data, the computing system comprising:

one or more processors; and a memory system comprising one or more non-transitory computer-readable media storing instructions that, when executed by at least one of the one or more processors, cause the computing system to perform operations, the operations comprising:

receiving multi-dimensional drilling dynamics data collected by a sensor positioned in a drilling tool;

determining a feature zone from a feature map based on the multi-dimensional drilling dynamics data, wherein;

the feature map comprises a two-dimensional representation of a plurality of points that encodes multi-dimensional drilling dynamics data;

the feature zone includes a subset of the plurality of points within a polygon region in the two-dimensional representation of the feature map;

the feature zone corresponds to a predetermined dynamic state associated with the received multi-dimensional drilling dynamics data; and the feature zone is determined using a supervised neural network trained to associate a plurality of feature zones with a plurality of dynamic states; and selecting at least one drilling parameter for a drill string based on the dynamic state corresponding to the determined feature zone.

12. The system of claim 11, wherein the multi-dimensional drilling dynamics data encoded by the feature map includes drilling dynamics data simulated by a processor including data associated with a simulation of a load on the drill string based on one or more predetermined rock formation characteristics.

13. The system of claim 11, wherein the multi-dimensional drilling dynamics data collected by the sensor positioned in the drilling tool includes at least one of: a first acceleration value, a second acceleration value, or a revolutions per minute value.

14. The system of claim 11, wherein the operations further comprise generating a machine learning algorithm based on the multi-dimensional drilling dynamics data, wherein the multi-dimensional drilling dynamics data includes drilling dynamics data simulated by a processor and drilling dynamics data collected by the sensor positioned in the drilling tool, and wherein the feature map is based upon an output from the machine learning algorithm.

15. The system of claim 11, wherein the two-dimensional representation is of a plurality of input data streams for a time window.

16. The system of claim 15, wherein the plurality of input data streams includes at least one of: a drill string acceleration in a horizontal direction, a drill string acceleration in a vertical direction, or a rotation of a drill string.

17. The system of claim 11, wherein the dynamic state corresponding to the feature zone comprises an axial movement of the drill string, a torsional movement of the drill string, or a lateral movement of the drill string.

18. The system of claim 11, wherein selecting the at least one drilling parameter includes selecting at least one of: a rotation of the drill string or a flow rate of the drill string.

19. A non-transitory computer-readable medium storing instructions that, when executed by one or more processors of a computing system, cause the computing system to perform a method for interpreting drilling dynamics data, the method comprising:

receiving multi-dimensional drilling dynamics data collected by a sensor positioned in a drilling tool;

determining a feature zone from a feature map based on of the multi-dimensional drilling dynamics data, wherein:

the feature map comprises a two-dimensional representation of a plurality of points that encodes multi-dimensional drilling dynamics data;

the feature zone includes a subset of the plurality of points within a polygon region in the two-dimensional representation of the feature map;

the feature zone corresponds to a predetermined dynamic state associated with the received multi-dimensional drilling dynamics data; and the feature zone is determined using a supervised neural network trained to associate a plurality of feature zones with a plurality of dynamic states; and selecting at least one drilling parameter for a drill string based on the dynamic state corresponding to the determined feature zone.

20. The non-transitory computer-readable medium of claim 19, wherein the dynamic state corresponding to the feature zone comprises an axial movement of the drill string, a torsional movement of the drill string, or a lateral movement of the drill string.

* * * * *